March 27, 1962   H. SCHÄFER   3,026,781

ROAD ROLLER

Filed Sept. 6, 1956

INVENTOR.

BY

United States Patent Office 3,026,781
Patented Mar. 27, 1962

3,026,781
ROAD ROLLER
Heinz Schäfer, Elz, Germany, assignor, by mesne assignments, to Scheid Maschinenfabrik Gesellschaft mit beschränkter Haftung, Limburg (Lahn), Germany
Filed Sept. 6, 1956, Ser. No. 608,238
Claims priority, application Germany June 1, 1956
4 Claims. (Cl. 94—50)

This invention relates to a road roller of the type having a vibrating roller body and comprising in the roller body a movable oscillating mass for producing the oscillating forces required to vibrate the roller member.

It is an object of the invention to provide a road roller whose oscillating mass is guided in such a way that its oscillations are substantially vertically directed and free from horizontal components.

Another object of the invention is to guide the oscillating mass in such a way that it is properly damped against horizontal oscillations and that any horizontal vibrations still occurring are prevented from being transmitted to the roller body.

Still another object of the invention is to provide an oscillating mechanism which is simple, cheap in manufacture, and reliable in operation.

A special object of the invention is to provide an oscillating mechanism which is constructed in such a way that the operating means for the oscillating mass likewise do not cause vibrations with horizontal components and have no slideways requiring lubrication.

With these and further objects in view, according to the invention the roller body is mounted for rotation on the outer periphery of a pair of pivoted members connected with the frame of the road roller and constructed in the form of sleeves whose bores form the bearings for the ends of an eccentric-shaft. The oscillating mass with its collar members is rotatably mounted on the eccentric shaft.

According to a preferred form of the invention, the oscillating mass is guided by elastic means permitting a substantially vertical movement only and exerting a damping effect in regard to any horizontal oscillating tendencies, said elastic damping and guiding means being connected on the one side to the oscillating mass and on the other side to fulcrum members connected with the non-rotary bearing members projecting into the interior of the roller body.

Advantageously, said fulcrums are formed by the walls of a vibrator housing enclosing the oscillating members and secured to the stationary bearing bolts or sleeves projecting into the interior of the roller body. The lower part of the vibrator housing is preferably constructed as an oilpan or trough.

According to a further feature of the invention, the elastic damping and guiding means are pre-loaded with an adjustable preliminary tension by providing tensioning means, such as tension or pressure screws for adjusting the pre-load from the outside of the vibrator housing. Tension springs, compression springs or rubber buffers may be provided as elastic damping and guiding means.

Advantageously, the driving shaft of the vibrator, more particularly the middle part thereof between the eccentrics driving the oscillating mass, includes an eccentric mass, more particularly, an eccentric shaft section, counteracting the horizontal forces produced by the eccentric and its connecting rod members. It is advisable, moreover, to provide a blower adapted to cool the vibrator and acting more particularly on the housing of the vibrator.

It is preferred to support the vibrating roller body in a bifurcated suspension frame pivoted at one end to the body of the road roller, and having lateral parts or side legs which support in their middle part the bearing pivots for the roller body and are supported against the body of the road roller by springs at their end facing away from the pivoted end of the frame.

Other and further objects, features and advantages of the invention will be pointed out hereinafter and appear in the appended claims forming part of the application.

In the accompanying drawings several now preferred embodiments of the invention are shown by way of illustration and not by way of limitation.

Similar reference numerals denote similar parts in the different views.

Figure 1:
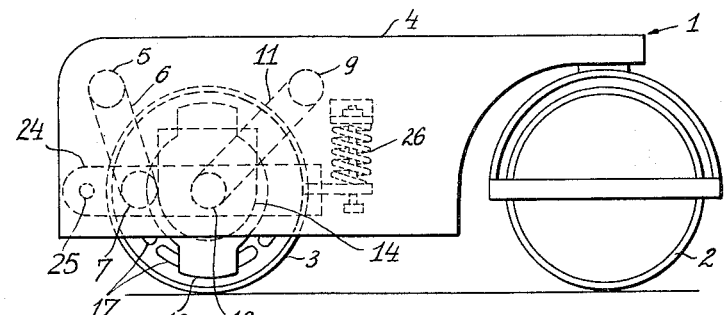
FIG. 1 is a diagrammatic side view of the roller.

Referring now to the drawings in greater detail, and first to FIG. 1, it will be seen that the road roller 1 comprises a forward steering roller 2 and a rearward driving and vibrating roller 3.

The main body 4 of the road roller may be constructed in the form of a frame lined with sheet metal or it may consist of self-supporting metal sheets, for accommodation of the various elements (not shown) required for operation of the road roller, such as, internal combustion engine, separate change-speed gears with coupling for forward or rearward motion of the road roller (traversing) and for driving the vibrator, braking and steering gear, e.g., with oil pressure operation, electric lighting, signalling, and starting means etc. The traversing gear for the rear roller is diagrammatically indicated by a chain wheel 5 connected to the engine gear and a chain wheel 7 driven thereby through chains 6 and being connected in its turn with a pinion (not shown) meshing with a toothed rim 8 laterally provided on the roller 3, 15. The vibrator gear consists of an engine driven chain wheel 9, a chain wheel 10 mounted on shaft 12, FIG. 2, and a chain 11 connecting said chain wheels. Said traversing and vibrator gears are mounted on the side of the road roller 1 opposite to the side shown in FIG. 1, while a vibrator blower is shown on the side exposed in FIG. 1, a part of the air channel 18 thereof being visible.

Figures 2, 3:
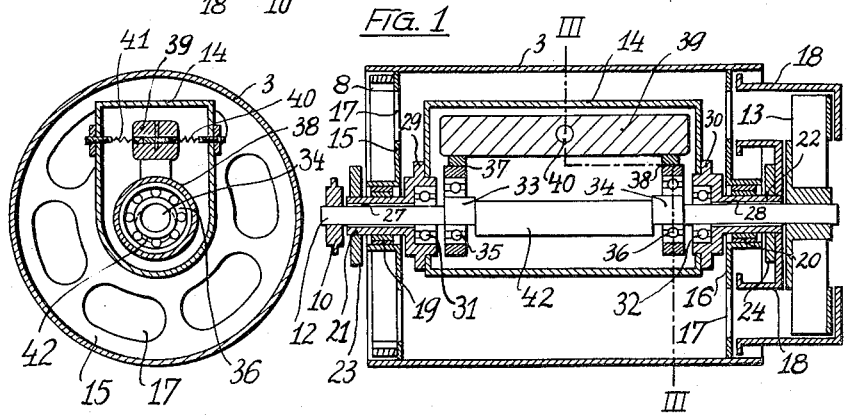
FIG. 2 is a diagrammatic vertical axial section through the rearward roller body and the vibrator.
FIG. 3 is a diagrammatic section on line III—III of FIG. 2, and FIGS. 4–6 are sections similar to FIG. 3, but showing various modifications.

The rear roller 3 is mounted by means of plain bearings 19, 20 on the outer periphery of bearing bushes or sleeves 21, 22, FIG. 2, which are fixedly secured to the side members 23, 24 of a bifurcated suspension frame which in its turn is pivoted to the machine body 4 at 25 and on the other hand is supported against the same by means of springs 26.

As will be seen from FIGS. 2 and 3, the roller body of the rear roller consists of a roller drum and two lateral members 15, 16 which are mounted for rotation by plain bearings 19, 20 on bushes 21, 22 rigidly connected to the side legs 23, 24 of a bifurcated suspension frame and provided with concentric bores 27, 28. Moreover, the portions 29, 30 of the sleeves 21, 22, projecting into the interior of the rollers are constructed for accommodation of ball or roller bearings 31, 32 supporting a vibrator driving shaft 12 extending through the roller 3, 15, 16 and through the bores 27, 28 of the sleeves 21, 22. Moreover, a vibrator casing 14 is fixedly connected to the bearing sleeves 21, 22, and thus to the side legs of the bifurcated suspension frame 23, 24, and, through the bearings 25, to the machine body 4. The vibrator driving camshaft 12 in casing 14 has two cams 33, 34 upon which the connecting rod members 37, 38 are rotatably mounted, with an oscillating mass 39 rigidly connected to the upper portion of said connecting rod, suitable bearings 35, 36 are provided for the camshaft.

The vibrator operates as follows:

If the vibrator shaft 12 is rotated at a high speed by means of the chain-wheel 10 mounted thereon outside of the roller 3, 15, 16, the oscillating mass 39 will carry out vertical oscillations of a frequency corresponding to the speed of shaft 12. Elastic means 40, 41 in the form of springs (FIG. 3) are inserted between the mass 39 and the casing 14 to hold the oscillating mass 39 laterally so that its center of gravity will remain substantially in a vertical plane passing through saft 12. Since the oscillating mass 39 is rigidly connected to the connecting rod 37, 38, it will carry out, in addition to the vertical motion, also a pendulous rotary motion which together with the rotary motion of the eccentric members 35, 36, 37, 38 causes an undesirable horizontal oscillating force, which, however, is compensated by the horizontal component of the oscillating force produced by the central portion 42 of the shaft 12 which portion 42 is eccentrically arranged in an opposite direction.

The vibrator casing 14 serves on the one hand for supporting the elastic means 40, 41, and on the other hand as an oil trough or oilpan for the highly stressed vibrator bearings 31, 32, 35, 36. The oil vapor produced in operation is sufficient to lubricate the fixing elements of the elastic means 40, 41. For dissipating the heat produced in the vibrator during operation thereof, its housing 14 is cooled by means of an air current blown through openings 17 of the side walls 15, 16 and through the interior of the roller 3, 15, 16, by a fan 18 whose fan wheel 13 seated on the end of the shaft 12 projecting from the bearing sleeve 22 is surrounded by a casing 18 acting to guide the cooling air.

Figures 4, 5, 6:
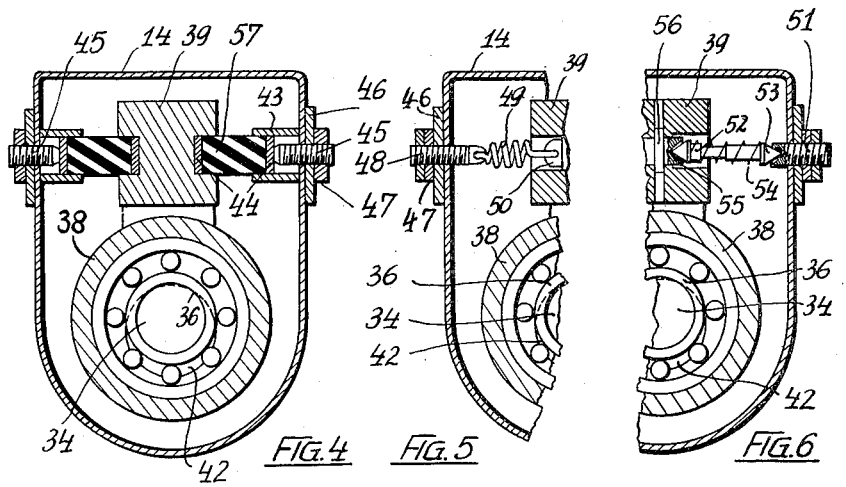

In the vibrator shown in FIG. 4 the oscillating mass 39 is held between rubber blocks 57 which are supported on the one side in recesses of the oscillating mass 39 and on the other side in guide sleeves 43 provided on the casing 14.

Screws 45 are movable in these guide sleeves 43 for adjustment of the pre-load of the elastic rubber blocks, said screws pressing on the one side on pressure plates 44 provided on the end faces of the rubber blocks, for instance, by vulcanising, and being supported on the other hand in threaded plates 46 secured to the casing 14. Nuts 47 serve to lock the screws 45 in position. The rubber blocks 57 preferably consist of an oil-resistant natural or synthetic rubber.

According to FIG. 5 tension springs 49 are substituted for the rubber blocks, said tension springs being anchored at one end in lugs of a body 50 inserted in the oscillating mass 39 and on the other end in lugs of a set screw 48, the body 50 being held in the oscillating mass by means of a pin 56. The set screws 48 with the aid of which a favorable pre-load is imparted to the springs 49 bear against plates 46 provided on the casing 14 and are secured against loosening by nuts and counter nuts 47.

FIG. 6 shows a modification in which compression springs 54 are used as guiding and damping means and adjustably pre-loaded. To this end, the compression springs 54 bear against pointed bodies 52, 53, having telescoped extensions for guiding the compression springs and preventing them from buckling. The joints of the bodies 52, 53 spread from each other by the spring 54 are supported between corresponding bearing cups of a body 55 and screws 51. The body 55 is supported in the oscillating mass 39 in the same manner as the body 50 (FIG. 5) and connected thereto by means of a pin 56. The pressure screws 51 are secured to threaded plates 46 fixed on the casing 14 similarly to the screws 45 in FIG. 5 and locked by nuts 47.

It will be understood that in the arrangements with adjustable pre-load, such as shown in FIGS. 4, 5 and 6, the set screws 45, or 48, or 51, respectively, can be adjusted from outside, through the large apertures 17 (FIG. 3) in the side walls 15 of the roller body.

It will be appreciated that the arrangement according to the invention offers very important advantages:

(1) The horizontal forces of oscillation occurring with any crank gear with finite ratio of connecting rod to crank are not rigidly transmitted to the roller but damped by elastic means, such as springs, rubber or the like.

(2) The slideways normally required for guiding reciprocating masses are avoided, whereby the sources of high wear and tear and disturbances of operation occurring in view of the high frequencies required and the long periods of operation are avoided.

(3) The elastic guiding means of the oscillating mass do not require much lubrication and attendance; but the oil vapor produced by rotation of the crank-shaft or eccentric shaft is sufficient for lubricating the bearing and other points of friction.

(4) The vibrator and the roller body can be assembled in a simple and quick manner.

(5) The tension of the elastic supporting and damping means can be quickly and easily adjusted to a favorable value from outside.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. In a road roller, a roller support, a hollow roller body, a pair of bearing members for said roller body in the form of sleeves fixedly connected to said roller support, a housing rigidly secured to and supported by said sleeves, said roller body being rotatably mounted on the outer circumference of said sleeves, a rotatable shaft provided with a central eccentrically disposed mass portion, mounted rotatably in said sleeves and traversing said roller body, eccentric cams mounted inside the roller body on said rotatable shaft, an oscillating mass, resilient means connecting said housing, and the oscillating mass, connecting rod members rotatably mounted on said eccentric cams and rigidly connected to said oscillating mass for raising and lowering said oscillating mass upon the rotation of said shaft, said eccentrically disposed mass portion providing a counterbalancing effect to the mass of said connecting rods and to said oscillating mass, and means for guiding the oscillating mass in substantially a vertical direction only, said guiding means being located inside said roller body and connecting said oscillating mass with said bearing members.

2. In a road roller, a roller support, a hollow roller body, a pair of bearing members for said roller body in the form of sleeves fixedly connected to said roller support, said roller body being rotatably mounted on the outer circumference of said sleeves, a rotatable shaft mounted rotatably in said sleeves and traversing said roller body, eccentric cams mounted inside the roller body on said rotatable shaft, an oscillating mass, connecting-rod members, rotatably mounted on said eccentric cams and rigidly connected to said oscillating mass for raising and lowering said oscillating mass upon the rotation of said eccentric shaft, eccentrically mounted masses connected to the connecting-rod members and adapted to counteract the eccentric masses of said eccentric cams and of said connecting-rod members, a vibrator housing located inside said roller body and rigidly secured to and supported upon said bearing members and enclosing said oscillating mass, said eccentrics, said connecting-rod members and said rotatable shaft and elastic means for guiding the oscillating mass in substantially a vertical direction only, said elastic guiding means connecting said vibrator housing and said oscillating mass.

3. In a road roller, a roller support, a hollow roller body with perforated lateral discs, a pair of bearing members for said roller body in the form of sleeves fixedly connected to said roller support, said roller body being rotatably mounted on the outer circumference of said sleeves, a rotatable shaft mounted rotatably in said sleeves and traversing said roller body, eccentric cams mounted inside the roller body on said rotatable shaft, an oscillating mass, connecting-rod members, rotatably mounted on said eccentric cams and rigidly connected to said oscillating mass for raising and lowering said oscillating mass upon the rotation of said shaft, a vibrator housing located inside said roller body and rigidly secured to and supported from said bearing members and enclosing said oscillating mass, said eccentric cams, said connecting-rod members and said rotatable shaft, elastic means for guiding the oscillating mass in substantially a vertical direction only, said elastic guiding means connecting said vibrator housing and said oscillating mass, said elastic guiding means being located inside said roller body and a blower located adjacent one of the perforated lateral discs, the blower-wheel being mounted on the rotatable shaft and the blower housing being connected with one of the bearing members and adapted to cool said vibrator housing.

4. In a road roller, a roller support, a hollow roller body, a suspension frame for the roller body having side members and being joined at one side to said roller support, bearing compression springs connected to the other ends of said side members for support against said roller support, a pair of bearing members for said roller body in the form of sleeves fixedly connected to the middle part of said side members of said suspension frame, said roller body being rotatably mounted on the outer circumference of said sleeves, a rotatable shaft mounted rotatably in said sleeves and traversing said roller body, eccentric cams mounted inside the roller body on said rotatable shaft, an oscillating mass, connecting-rod members rotatably mounted on said eccentric cams and rigidly connected to said oscillating mass for raising and lowering said oscillating mass upon the rotation of said shaft, a vibrator housing located inside said roller body and rigidly secured to and supported upon said bearing members and enclosing said oscillating mass, said eccentric cams, said connecting-rod members and said rotatable shaft and elastic means for guiding the oscillating mass in substantially a vertical direction only, said elastic guiding means connecting said vibrator housing and said oscillating mass.

References Cited in the file of this patent

UNITED STATES PATENTS

| | | |
|---|---|---|
| 1,657,727 | Stubbs | Jan. 31, 1928 |
| 1,894,408 | MacKenzie | Jan. 17, 1933 |
| 2,188,482 | Parks | Jan. 30, 1940 |
| 2,309,172 | De Kanski | Jan. 26, 1943 |
| 2,334,973 | Whiteman | Nov. 23, 1943 |
| 2,340,031 | Whiteman | Jan. 25, 1944 |
| 2,622,444 | Waldvogel | Dec. 23, 1952 |
| 2,641,975 | Cletus et al. | June 16, 1953 |
| 2,646,729 | Godenir | July 28, 1953 |
| 2,677,995 | Wood | May 11, 1954 |

FOREIGN PATENTS

| | | |
|---|---|---|
| 870,769 | Germany | Mar. 16, 1953 |